United States Patent
Zeng

(10) Patent No.: US 9,063,644 B2
(45) Date of Patent: Jun. 23, 2015

(54) ADJUSTMENT MECHANISMS FOR VIRTUAL KNOBS ON A TOUCHSCREEN INTERFACE

(75) Inventor: Peng Zeng, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 115 days.

(21) Appl. No.: 13/430,100

(22) Filed: Mar. 26, 2012

(65) Prior Publication Data
US 2013/0249814 A1    Sep. 26, 2013

(51) Int. Cl.
G06F 3/041    (2006.01)
G06F 3/0484   (2013.01)
G06F 3/0488   (2013.01)

(52) U.S. Cl.
CPC .......... G06F 3/04847 (2013.01); G06F 3/0488 (2013.01)

(58) Field of Classification Search
CPC ............................ G06F 3/04847; G06F 3/0488
USPC ............ 345/156, 173–184; 178/18.01–18.09, 178/19.01–19.04
See application file for complete search history.

(56) References Cited

U.S. PATENT DOCUMENTS

| | | | |
|---|---|---|---|
| 6,468,212 B1 * | 10/2002 | Scott et al. ..................... | 600/437 |
| 7,720,552 B1 | 5/2010 | Lloyd | |
| 2010/0177049 A1 * | 7/2010 | Levy et al. ..................... | 345/173 |
| 2010/0188415 A1 * | 7/2010 | Pettigrew et al. ............ | 345/589 |
| 2011/0029865 A1 * | 2/2011 | Gilland et al. ................ | 715/702 |
| 2011/0109546 A1 | 5/2011 | Milne et al. | |
| 2012/0056733 A1 * | 3/2012 | Ramsay et al. ............ | 340/407.2 |
| 2012/0063615 A1 | 3/2012 | Crockett | |

OTHER PUBLICATIONS

UK Search and Examination Report from GB Application No. GB1304997.8 dated Oct. 1, 2013.

* cited by examiner

*Primary Examiner* — Kumar Patel
*Assistant Examiner* — Insa Sadio
(74) *Attorney, Agent, or Firm* — Baldauff IP, LLC; Michael J. Baldauff, Jr.

(57) ABSTRACT

The disclosure herein provides for interpreting and facilitating user input to virtual knobs on a touchscreen interface. Aspects of the disclosure provide for the interpretation of a contact with a virtual knob of a device represented on a touchscreen interface. In response to the contact, a state change associated with the virtual knob may be made, or an annular input icon displayed around the virtual knob. The annular input icon may guide an adjustment of the virtual knob.

19 Claims, 7 Drawing Sheets

US 9,063,644 B2

ADJUSTMENT MECHANISMS FOR VIRTUAL KNOBS ON A TOUCHSCREEN INTERFACE

BACKGROUND

Touchscreen interfaces are becoming increasingly popular as a means for providing a user with graphical and textual information and accepting input via direct contact on the touchscreen from the user's finger. Most smartphones and many personal computers utilize touchscreen technology to provide efficient interaction with users. A touchscreen interface essentially provides a program designer a blank canvas with which to display any desired graphical and textual depiction and to accept input directly on that depiction at any desired input location. The displayed graphics and text on a touchscreen interface may be dynamically altered at any desired time along with the number, type, and positioning of input locations through which input is accepted from the user via finger contact with the touchscreen.

This versatility provided by touchscreen technology presents training opportunities in which various control panels and instruments may be simulated on an electronic device having a touchscreen. For example, aircraft cockpit instrumentation may be simulated on a tablet computer or flat screen panel utilizing a touchscreen interface. Moreover, cockpits in actual aircraft may additionally trend towards the use of flat screen panels having virtual avionics displayed on a touchscreen. In a training environment, various flight operations may be simulated for a pilot or crewmember on the virtual instruments displayed on the touchscreen. These types of simulations may be particularly realistic when the instrument being simulated utilizes buttons for receiving input. A virtual button may be displayed at a proper location on the virtual instrument where it would be located on the corresponding physical instrument. A user, such as a pilot or crewmember, may touch the touchscreen interface at the location in which the virtual button is displayed. This contact of the user's finger with the touchscreen interface at the location of the virtual button may be interpreted as a physical press of the corresponding button.

However, when a virtual instrument simulates an instrument that utilizes knobs that are physically turned by a pilot or crewmember, the two-dimensional simulation of the virtual knobs on the touchscreen interface may not be physically turned in the manner in which an actual three-dimensional knob is turned. According to a conventional method for simulating input to a virtual knob, the user selects the virtual knob displayed on the two-dimensional touchscreen interface. In response to the selection of the virtual knob, a slider may pop up in the center of the touchscreen interface. The user may then slide a finger left or right along the slider to adjust the parameter corresponding to the virtual knob in a similar manner as if the knob were being turned clockwise or counterclockwise.

There are limitations with this type of interaction with a virtual knob. First, the input is not realistic. Sliding a finger linearly along a two-dimensional touchscreen surface is not similar to the actual physical turning of a three-dimensional knob. Additionally, the location in which the slider is displayed may not be the same location as the virtual knob. As a result, the user may make one action at a first location during selection of the control, and then physically move his or her finger to the second location of the slider to adjust the control. This movement is not realistic, may create input errors due to relocating the user's finger, and may undesirably divert the user's attention from performing a primary action as he or she looks down at the touchscreen interface to locate the slider after selecting the virtual knob.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods and computer-readable storage media described herein provide for the selective display of annular input icons on a touchscreen interface for adjustment of virtual knobs. Types of user contact are also distinguished to provide for device state changes and corresponding virtual knob adjustments. According to one aspect, a computer-implemented method includes providing a representation of a device with a virtual knob on a touchscreen interface. The selection of the virtual knob may be detected, and in response, an annular input icon may be positioned around the virtual knob for accepting user input. The user input to the virtual knob via the annular input icon may be detected and a corresponding adjustment made to the device.

According to another aspect, a computer-implemented method includes providing a representation of a device with a number of virtual knobs on a touchscreen interface. A selection of one of the knobs may be detected, and in response, a state of the device may be changed. A second selection of one of the knobs may be detected, and in response, a determination may be made as to which virtual knob is to receive user input. An annular input icon may be displayed around the virtual knob determined to receive the user input. The user input to the virtual knob via the annular input icon may be detected and a corresponding adjustment made to the device.

According to yet another aspect, a computer-readable storage medium includes instructions that, when executed by a computer, cause the computer to provide a representation of a device with a number of virtual knobs on a touchscreen interface. A selection of one virtual knob may be detected, and in response, the virtual knob to receive user input may be determined. An annular input icon may be displayed around the virtual knob to receive the user input. After detecting the user input corresponding to the annular input icon, the device may be adjusted accordingly.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1A:
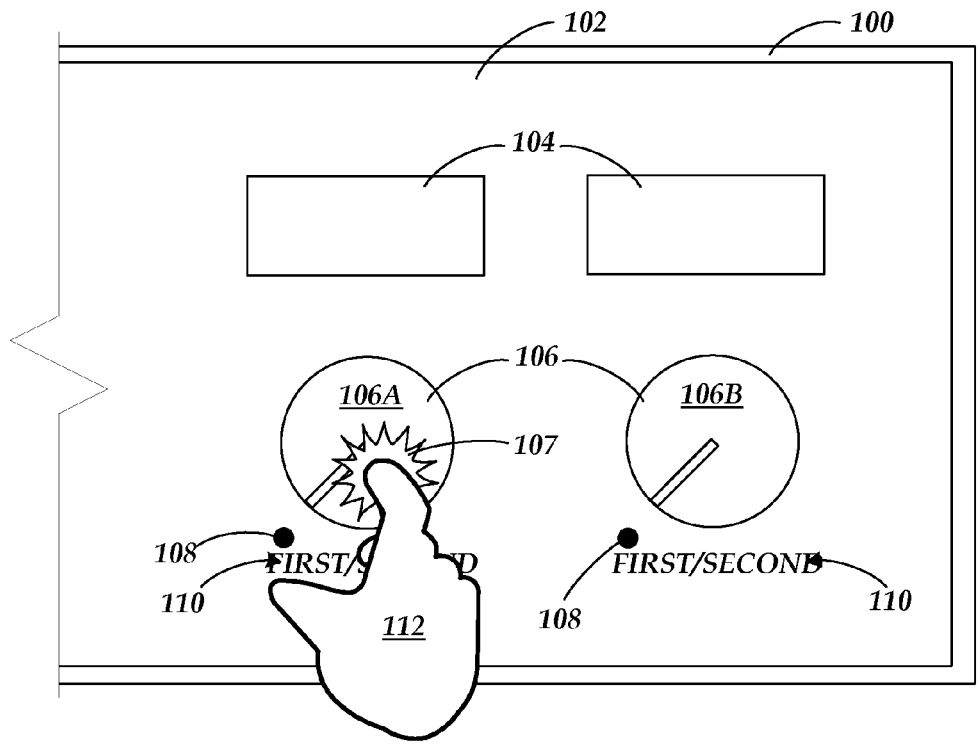
FIGS. 1A-1F are display diagrams illustrating aspects of a virtual knob adjustment process associated with a device depicted on a touchscreen interface according to various embodiments presented herein.

The following detailed description is directed to facilitating user input for a virtual knob on a touchscreen interface. As discussed above, touchscreen interfaces are becoming increasingly popular for use with a vast number of applications. Examples in the aircraft industry include using touchscreen devices to simulate instruments and controls for training purposes, as well as for actual instrument panels in aircraft cockpits. While extremely useful in providing the user with the flexibility to customize a particular touchscreen interface as desired, touchscreen interfaces do not adequately simulate the act of adjusting a physical knob.

Many aircraft instruments and other devices utilize three-dimensional control knobs that a user twists or rotates to provide control input. Because of the two-dimensional depiction of a three-dimensional knob, a user is unable to adjust a virtual knob in the same manner as he or she would adjust an actual physical knob. As a result, a conventional simulation on a touchscreen interface may initiate a secondary interface such as a slider when a virtual knob is selected for adjustment. The secondary interface is not realistic and may create a distraction when the user operates the actual physical instruments after training on a touchscreen simulator that utilizes methods for adjusting the virtual controls that differ from the adjustment of the physical knobs on the actual instruments.

Utilizing the concepts and technologies described herein, an annular input icon may be displayed around a virtual knob on a touchscreen interface to assist the user in determining the proper placement and motion for adjusting the virtual knob. The circular motion used to provide input to an annular input icon most closely simulates the actual rotation of a corresponding physical knob being simulated by the touchscreen. Software may be utilized in conjunction with the touchscreen interface and virtual knobs to recognize user contact with the annular input icon and to perform the appropriate adjustments of the virtual knob. For example, a user may rotate his or her finger around an annular input icon provided around a virtual knob just as he or she would do with a traditional knob or wheel of a conventional instrument display. Utilizing the corresponding software, a processor of a computing device recognizes the user input with respect to the virtual knob and initiates the corresponding device response.

As used throughout this disclosure, the terms "touchscreen interface" and "touchscreen" may refer to any capacitive display device or other interface surface that allows a user to provide input to a corresponding device or system by interacting with one or more virtual controls represented on a display surface using a finger, stylus, or other mechanism. A "virtual knob" may be any representation of a three-dimensional physical knob or dial on an instrument or device. User interaction or manipulation provided to the virtual knob (i.e., via the annular input icons described below) results in a desired input to the simulated device associated with the virtual knob.

In the following detailed description, references are made to the accompanying drawings that form a part hereof, and which are shown by way of illustration, specific embodiments, or examples. Referring now to the drawings, in which like numerals represent like elements through the several figures, methods for interpreting and facilitating user input to virtual knobs on a touchscreen interface according to the various embodiments will be described.

FIG. 1 shows a view of a touchscreen interface 100. As discussed above, the touchscreen interface 100 may include any device having a surface that allows a user to provide input by interacting with one or more virtual controls represented on a display surface using a finger, stylus, or other mechanism. Examples include, but are not limited to, a tablet computer, an electronic reader, a touchscreen desktop or laptop computer, a smartphone, an MP3 or other digital music player, and a touchscreen panel such those used within an aircraft or other vehicle cockpit or simulator.

According to this embodiment, a representation of a device 102 is displayed on the touchscreen interface 100. The device 102 may be any type of electronic device having one or more controls, such as knobs, wheels, switches, and buttons. For clarity purposes, the various embodiments described herein will be discussed with respect to a device 102 having two virtual knobs 106A and 106B (referred to in general as virtual knobs 106) and two corresponding control displays 104. The control displays 104 may provide text or graphical data corresponding to the positioning of the virtual knobs 106. For example, the device 102 may be an aircraft communications radio in which a virtual knob 106 may be used to tune the radio to a specific frequency, which may be displayed on a control display 104.

In this example, the virtual knobs 106 may each include a reference position indicator 108 that represents a starting position for the control. As an example, when a virtual knob 106 is turned to align with the reference position indicator 108 as shown in FIG. 1A, the control may be in an "off" position or at a lowest value of a range of settings. According to various embodiments, the virtual knobs 106 may be turned clockwise or counterclockwise to adjust a parameter of the device 102. The virtual knobs 106 may also include a state indicator 110 or control label that identifies one or more states associated with the particular virtual knob 106. The state indicator 110 may provide a user with an identification of a first state and a second state associated with the virtual knob 106. The virtual knob 106 may be pushed or pulled to switch between the first and second states before an adjustment is made within the selected state through a clockwise or counterclockwise turn of the knob.

For example, according to one embodiment, the device 102 may include an aircraft radio component. The state indicator 110 for virtual knob 106A may be represented as "OPER/CALL," which indicates to a user that the virtual knob 106A may be pushed or pulled to switch between "OPER" and "CALL" states before turning the virtual knob 106A to adjust the radio settings in each of the two states. It should be appreciated that the concepts described herein are not limited to this or other specific embodiments. Rather, a touchscreen interface 100 may display any number and type of devices 102 simultaneously. Each device 102 may include any number of virtual knobs 106. Each virtual knob 106 may be used to adjust one or more control parameters in one or more states. In other words, a virtual knob 106 may simulate pushing or pulling of the knob to change states prior to adjustment as described below, or may simply be rotated to adjust a single parameter within a single state without an option to change states.

Referring to FIGS. 1A-1F, an illustrative example of an adjustment to a virtual knob 106A will be described according to one embodiment. To initiate the adjustment, FIG. 1A shows a user tapping the virtual knob 106A with his or her hand 112. In this example, the virtual knob 106B is not being adjusted and will remain unaltered. Because the virtual knob 106A is a two-dimensional representation of a three-dimensional control knob and cannot be physically pulled, pushed, and rotated, embodiments herein distinguish between various types of contact from the user to determine a desired course of action. The desire to alter the state of the virtual knob 106A (corresponding to a push or pull of a three-dimensional knob) may be identified from an extended contact with the virtual knob 106A, such as pressing the virtual knob 106A and maintaining contact with the touchscreen interface 100 for a brief pre-determined period of time. This extended contact will be illustrated and described below with respect to FIGS. 2A and 2B. The desire to adjust the parameter associated with the knob (corresponding to a rotation or twisting of a three-dimensional knob) may be identified from a tapping or brief contact with the virtual knob 106A. Tap icon 107 will be used in the figures to identify a tap or brief contact of a finger or stylus on a virtual knob 106 to initiate an adjustment of the virtual knob 106.

Figure 1B:
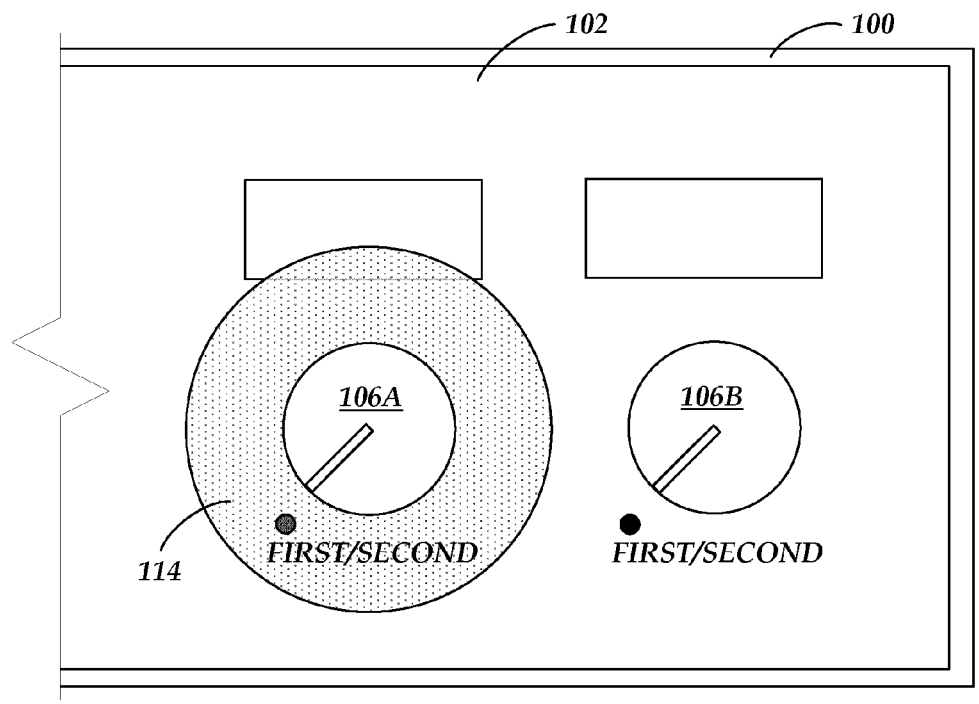

A processor executing software associated with the display and operation of the device 102 recognizes the tap on the virtual knob 106A and in response, provides an annular input icon 114 around the virtual knob 106A as shown in FIG. 1B. The annular input icon 114 visually identifies an area around the virtual knob 106A being adjusted in which user input will be recognized. The annular input icon 114 may include a ring of any diameter that encircles the virtual knob 106A. As seen in FIG. 1B, the annular input icon 114 may have a shading, color, or pattern so as to more clearly highlight the area around the virtual knob 106A in which the user may contact to make the desired adjustments. According to one embodiment, the annular input icon 114 is translucent in order to allow for any underlying text or graphics to be visible when the annular input icon 114 is displayed around the virtual knob 106A.

One benefit of displaying the annular input icon 114 is to visually identify the area for input to the user. Another benefit is that the virtual knobs 106 may be simulated according to the actual size of the corresponding three-dimensional knobs while providing additional space around the knobs for the user to adjust the knobs. Without the annular input icons 114 being displayed around the virtual knobs 106, a virtual knob would need to be displayed as a significantly larger knob than its corresponding three-dimensional counterpart in order for the user to accurately adjust a virtual knob 106 by rotating his or her finger on the virtual knob itself. By representing the virtual knobs 106 in actual size with the annular input icons 114 displayed around the knobs, realism is preserved while minimizing the screen space used when rendering the device 102 on the touchscreen interface 100.

Figure 1C:
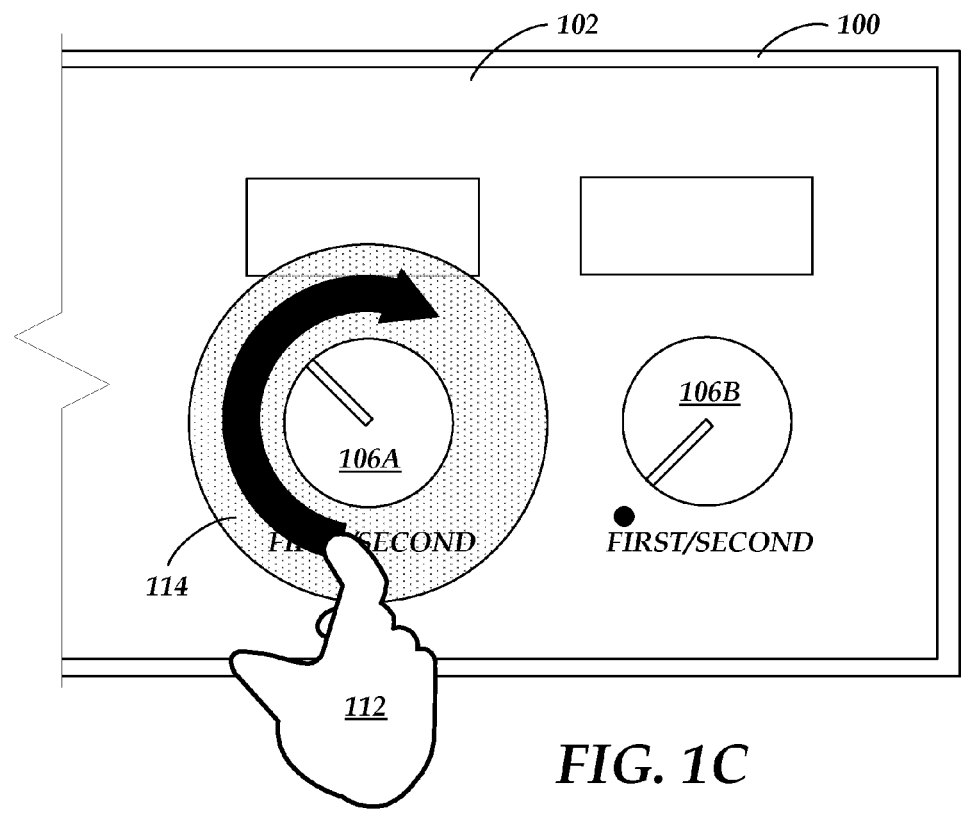
Figure 1D:
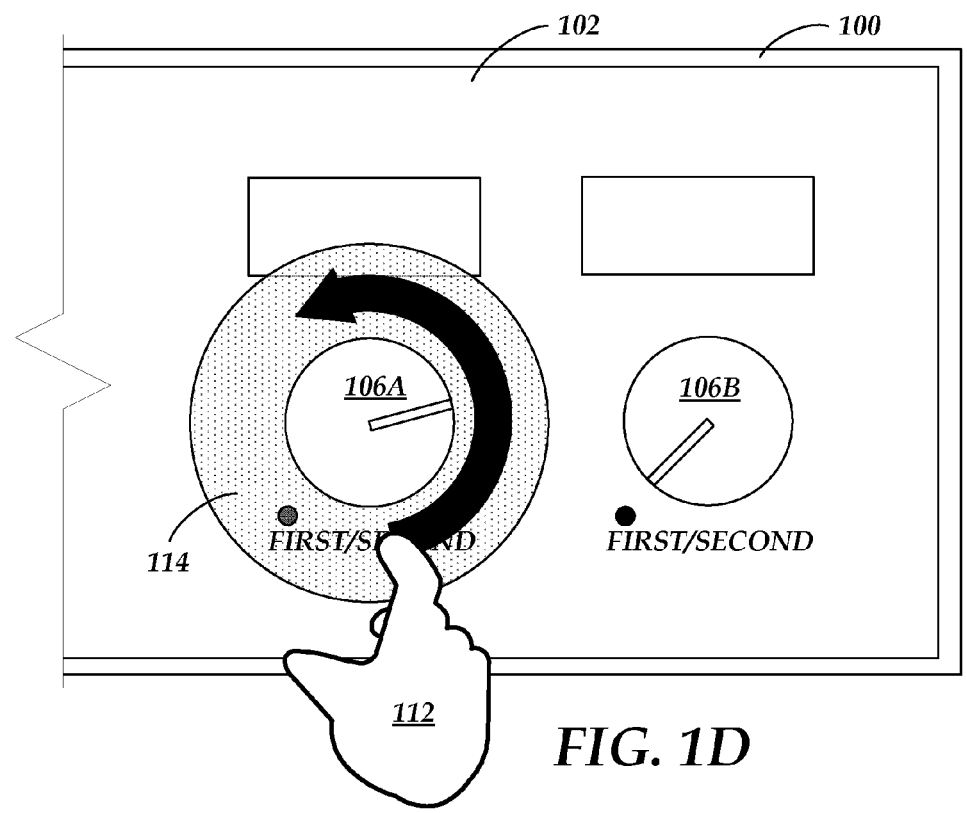
Figure 1E:
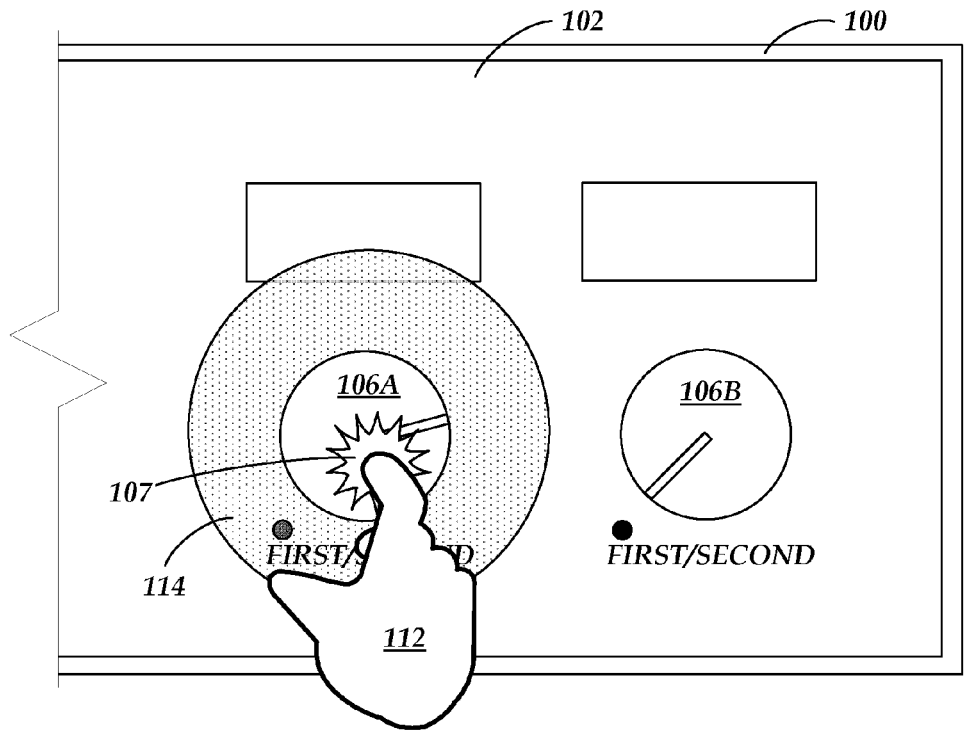
Figure 1F:
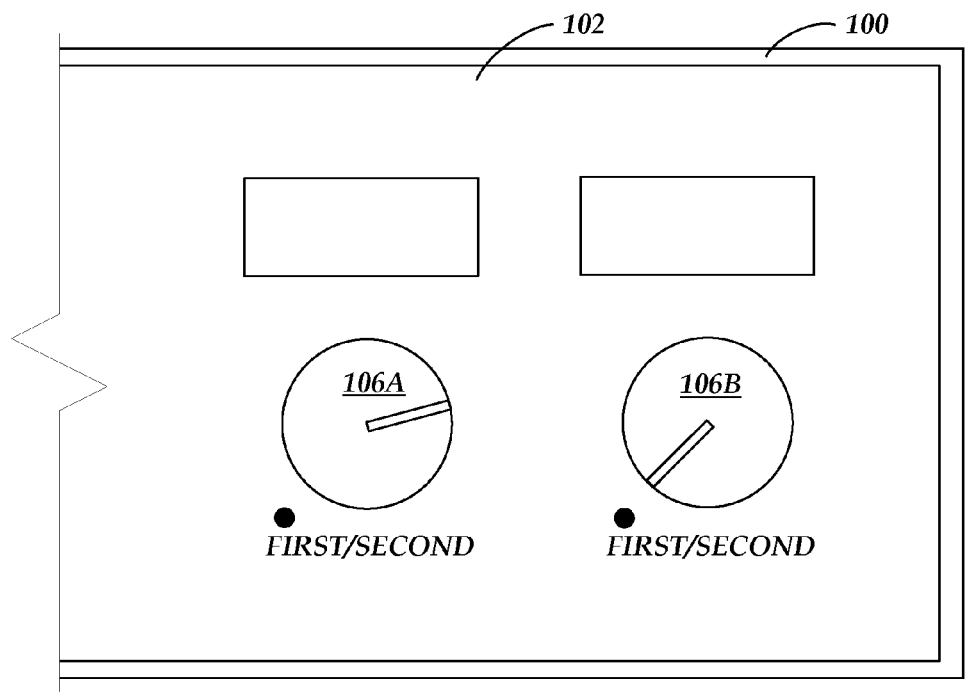

Turning to FIGS. 1C and 1D, the adjustment of the virtual knob 106A will be described in further detail. FIG. 1C shows the user adjusting the virtual knob 106A by placing a finger on the annular input icon 114 and sliding the finger in a clockwise direction around the virtual knob 106A. The processor will detect the arcuate contact between the finger and the touchscreen interface 100 and the corresponding motion around the annular input icon 114. Clockwise rotation of the finger will be interpreted as rotating the virtual knob 106A in a clockwise direction, and the parameter associated with the virtual knob 106A (i.e., radio frequency) will be adjusted accordingly. According to one embodiment, the representation of the virtual knob 106A may be rotated concurrently with the finger movement in the corresponding direction, just as if the user were rotating a physical three-dimensional knob. FIG. 1D shows a similar adjustment, but in the counterclockwise direction. The annular input icon 114 may remain displayed on the touchscreen interface 100 for receiving user input until removed by the user, as shown in FIGS. 1E and 1F.

FIG. 1E shows the user again tapping the virtual knob 106A. Because the annular input icon 114 is already displayed on the touchscreen interface 100, the device control application executed by the processor recognizes this tap as an instruction to remove the annular input icon 114 since adjustment of the virtual knob 106A is no longer desired. As seen in FIG. 1F, the processor responds to the second tap (the first tap triggering the display of the annular input icon 114) by removing the annular input icon 114 from the touchscreen interface 100. Should further adjustment of a virtual knob 106 be desired, the user would tap the desired knob to produce the corresponding annular input icon 114 and adjust accordingly.

Figure 2A:
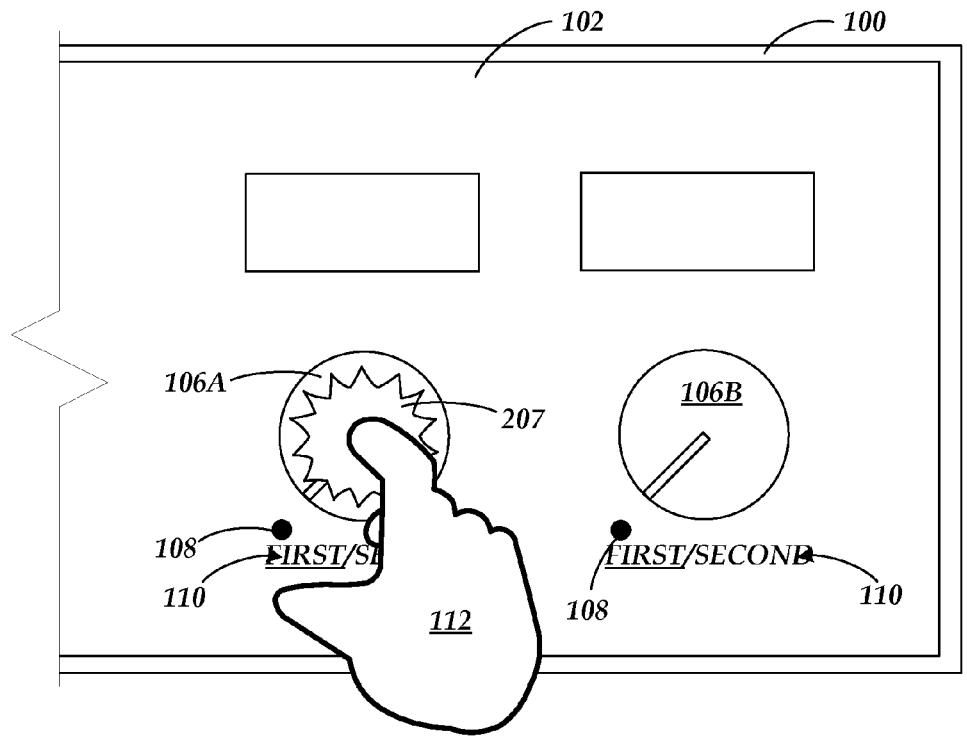
FIGS. 2A and 2B are display diagrams illustrating aspects of a virtual knob state change process associated with a device depicted on a touchscreen interface according to various embodiments presented herein.
Figure 2B:
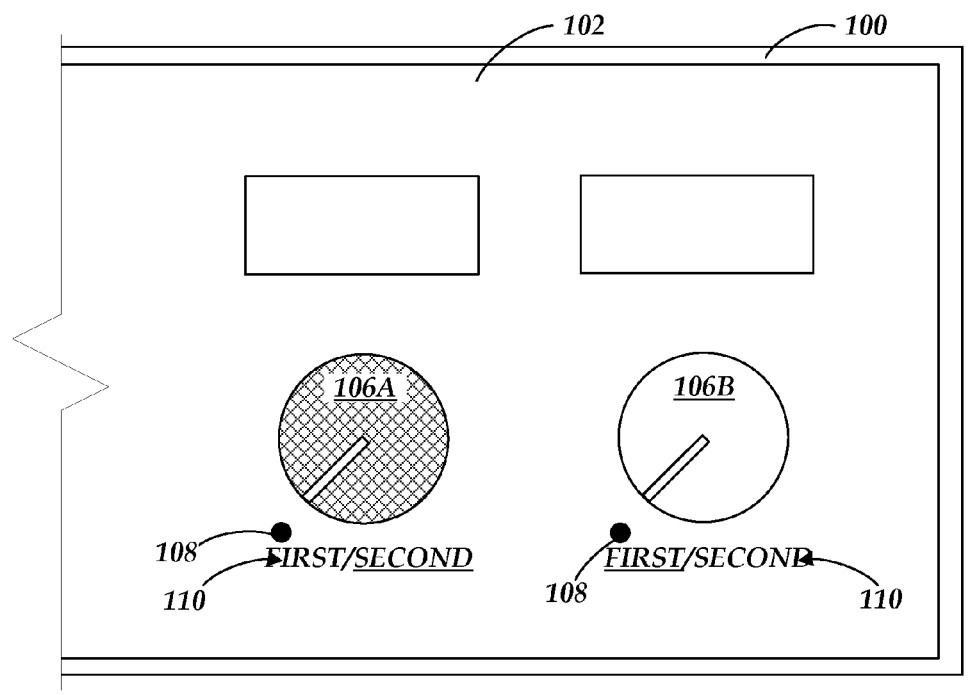

Turning to FIGS. 2A and 2B, an illustrative example of a state adjustment of a virtual knob 106A will be described according to one embodiment. As discussed above, various implementations may include a virtual knob 106 that may be used to adjust one or more parameters in two different states. With a conventional three-dimensional knob on an electronic device, the knob may be configured to be pressed inward to control a parameter according to a first state and pulled outward to control a parameter according to a second state. It is possible that a knob could be pushed and pulled through any number of stops or positions to control parameters in more than two states. According to one embodiment, a virtual knob 106 may simulate a three-dimensional knob capable of adjusting a parameter according to multiple states.

FIG. 2A shows one implementation in which a user applies an extended contact on the touchscreen interface 100 at a position on a virtual knob 106 to trigger a state change. Similar to the tap icon 107 used to represent a tap or brief contact of a finger or stylus on a virtual knob 106 to initiate an adjustment of the virtual knob 106, an extended contact icon 207 will be used in the figures to represent a press and hold action taken by the user to initiate a state change corresponding to the virtual knob 106. As seen in the example shown in FIG. 2A, the state indicators 110 of the virtual knobs 106A and 106B indicate that both controls are positioned in a first state. It should be understood that the state indicators 110 may be configured to dynamically display the current state of the corresponding virtual knob 106 as the state is modified, or may be configured to statically display the available states associated with the virtual knobs 106.

The user may perform an extended contact, or a press and hold action, on the virtual knob 106A in order to trigger a state change of the knob. As seen in FIG. 2B, the processor responds to the extended contact on virtual knob 106A by altering the state of the virtual knob 106A from the first state to the second state. According to one embodiment, the state change may be visually indicated via a change in the color, shading, or pattern of the virtual knob 106A, as well as a change in the state indicator 110. After altering the state of the virtual knob 106A, a return to the first state may be made in an identical manner, specifically via an extended contact with the virtual knob 106A. Moreover, an adjustment of the virtual knob 106A in the second state may be made in the same manner described above with respect to FIGS. 1A-1E.

As described above, an extended contact with a virtual knob 106 may trigger a state change that remains until a second extended contact with the virtual knob 106 returns the state to the original state or changes the state to yet another state. According to an alternative embodiment, an extended contact with a virtual knob may temporarily change the state of the device as long as the virtual knob is held, which may simulate a button press. In this alternative embodiment, any particular knob may be configured to temporarily change from a first state to a second state as long as the knob is held, returning to the first state upon release of the virtual knob 106. As an example, a virtual knob 106 of a communication radio may be configured to display an annular input icon 114 for receiving an adjustment to the frequency or volume with a tap action, while being configured as a transmit button that may be pressed and held by a user to transmit a voice communication over the selected frequency. Upon release of the virtual knob 106, the virtual knob 106 may again be tapped to trigger an annular input icon 114 for adjustment.

The virtual knobs 106 may be further configured to "temporarily" or "permanently" change state in response to an extended contact depending on the period of time in which the knob is held or contacted. For example, the virtual knob 106 may change state and remain in the new state in response to the extended contact being held beyond a threshold period of time, even if subsequently released. The virtual knob 106 may temporarily change to a different state while the knob is held, but return to the original state upon release of the knob in response to the extended contact being held for a period of time between a time interpreted as a tap and a time corresponding to the threshold period of time discussed above. It should be understood that the concepts described herein are not limited to any particular configuration of the virtual knobs 106 with respect to a period of time in which extended contact is detected. Rather, the particular configuration may depend on the possible actions with respect to the actual three-dimensional knobs of the device that are being simulated by the virtual knobs 106 of the device 102 represented on the touchscreen interface 100.

Figure 3A:
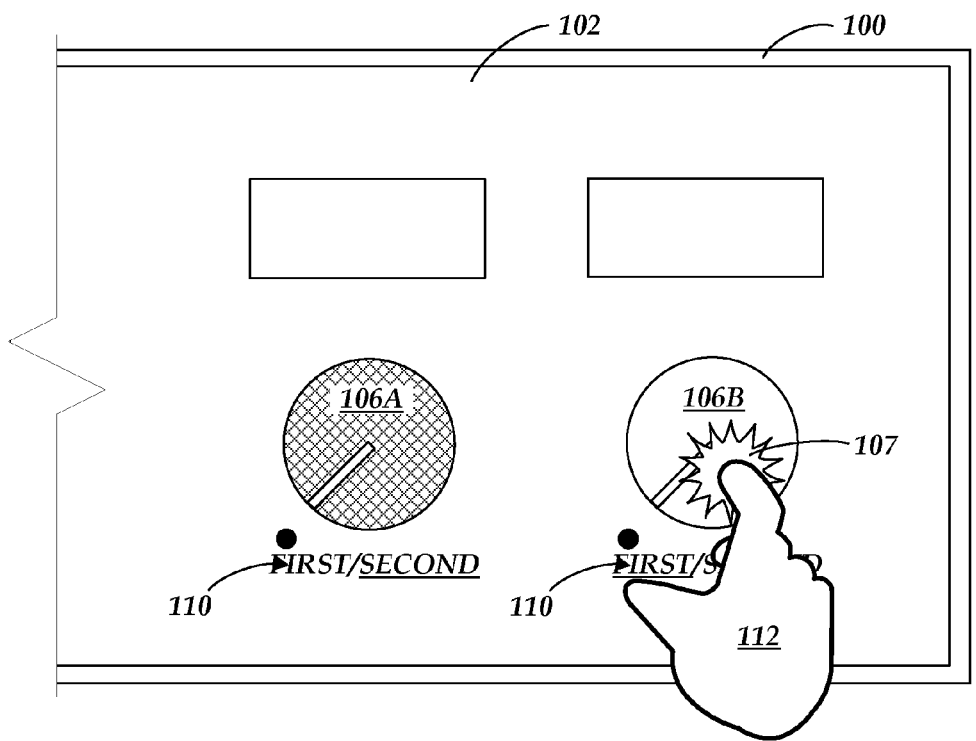
FIGS. 3A and 3B are display diagrams illustrating the positioning of an annular input icon in response to the selection of a virtual knob of a device depicted on a touchscreen interface according to various embodiments presented herein.
Figure 3B:
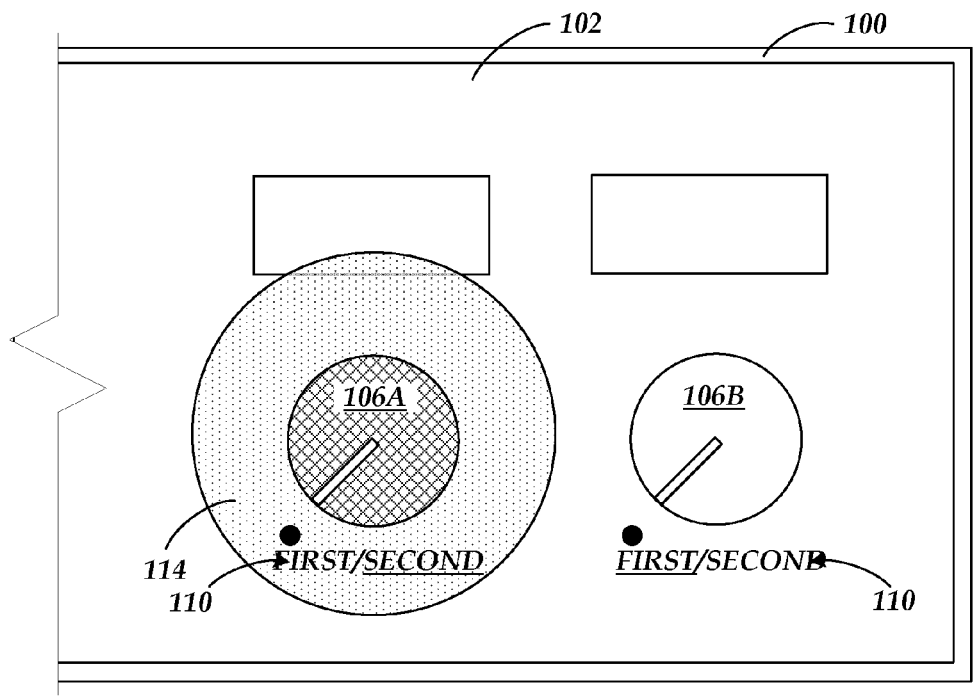

FIGS. 3A and 3B illustrate an embodiment in which an adjustment to a virtual knob 106 is only allowed if the adjustment is available given the corresponding state of the device 102. As discussed briefly above, the adjustment of certain parameters may be limited to a particular state of the device 102, or of a state of one or more controls of the device 102. FIG. 3A illustrates a device 102 having a virtual knob 106A configured in a second state and a virtual knob 106B configured in a first state. A user taps the virtual knob 106B, as indicated by the tap icon 107, to trigger the display of an annular input icon 114 around the virtual knob 106B for performing an adjustment of the virtual knob 106B. However, according to this example, the virtual knob 106B in the first state is not adjustable when the virtual knob 106A is configured in the second state.

FIG. 3B shows one potential response to the tap on virtual knob 106B according to this embodiment. Upon determining that the adjustment to virtual knob 106B is not possible, the processor may determine that an adjustment to virtual knob 106A is possible and display the annular input icon 114 around the virtual knob 106A. The user may then adjust virtual knob 106A using the annular input icon 114 or tap either virtual knob 106 to remove the annular input icon 114.

According to various embodiments, feedback may be provided to the user in response to providing user input, or concurrently with user input. The feedback may not only be visual such as the change in color, shading, or pattern of the virtual knobs as described above, but may also be aural and tactile. For example, an audible tone and or device vibration may be provided upon receipt of a tap or extended contact from the user to a virtual knob 106. Additionally, a clicking sound, tone, and/or vibration may be provided upon rotation of a user's finger around the annular input icon 114.

Figure 4:
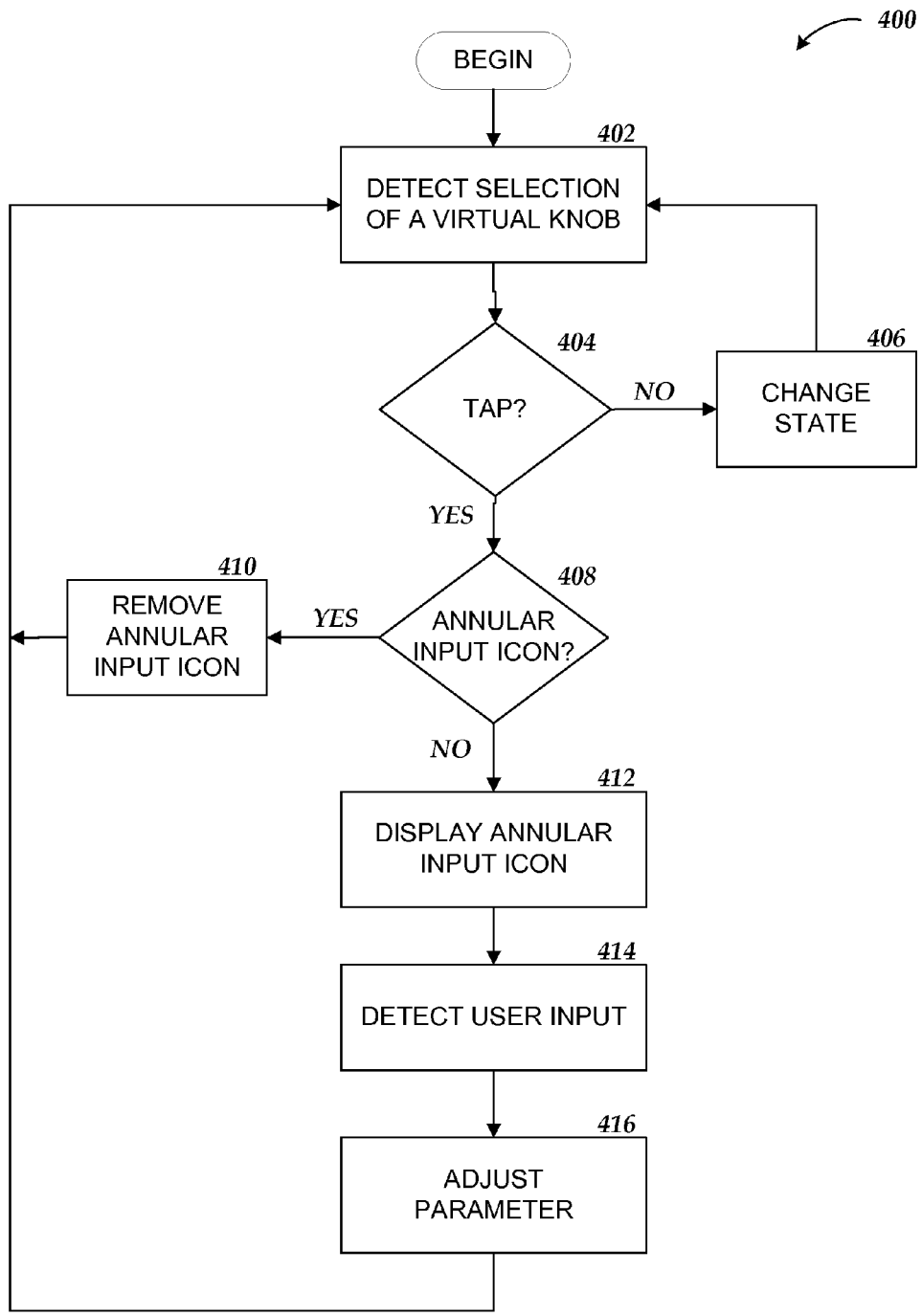
FIG. 4 is a flow diagram showing a method of receiving user input at a touchscreen interface according to various embodiments presented herein.

Turning now to FIG. 4, an illustrative routine 400 for receiving user input to a device 102 represented on a touchscreen interface 100 will now be described in detail. It should be appreciated that the logical operations described herein with respect to FIG. 4 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The routine 400 begins at operation 402, where a device control application associated with the touchscreen interface 100 or a device 102 detects a selection of a virtual knob 106. This selection may be made as a tap or an extended contact of a finger or stylus with a desired virtual knob 106. At operation 404, a determination is made as to whether the selection was a tap on a virtual knob 106. If not, then the device control application determines that the selection included an extended contact of the virtual knob 106, and changes the state corresponding to the selected virtual knob 106 at operation 406. The routine 400 then returns to operation 402 and continues as described above.

It should be appreciated that the determination as to whether the selection of the virtual knob 106 is a tap or an extended contact may or may not include a determination as to whether the contact falls within a parameter for one type of contact, and if not, then determining that the selection corresponds to the other type of contact. For example, the device control application may determine that contact with a virtual knob 106 is an extended contact because it does not occur for less than a threshold period of time (which represents a tap) or because it does occur for more than a threshold period of time (which represents an extended contact).

However, if at operation 404, the device control application determines that the selection was a tap on the virtual knob 106, then the routine 400 continues to operation 408, where a determination is made as to whether an annular input icon 114 is already displayed on the touchscreen interface 100. If an annular input icon 114 is displayed, then the device control application may determine that the selection of the virtual knob 106 is a request to remove the annular input icon 114 due to the completion of any desired adjustment, and may remove the annular input icon 114 at operation 410. The routine 40 then returns to operation 402 and continues as described above.

If at operation 408, the device control application determines that an annular input icon 114 is not displayed on the touchscreen interface 100, then the device control application may be displayed around the appropriate virtual knob 106 at operation 412. As previously discussed, the annular input icon 114 may be displayed around the virtual knob 106 tapped by the user, or if the virtual knob 106 that was tapped by the user is not available for adjustment due to the current state of the device 102, then the annular input icon 114 may be displayed around a virtual knob 106 that is available for adjustment.

The routine 400 continues from operation 412 to operation 414, where the device control application detects user input within the annular input icon 114 and adjusts the corresponding virtual knob 106 accordingly at operation 416. The user input to the annular input icon 114 may include a rotational swipe or sliding contact around the annular input icon 114 in either the clockwise or counterclockwise directions depending on the desired adjustment of the corresponding virtual knob 106. From operation 416, the routine returns to operation 402 and continues as described above.

In addition to the operations described with respect to the routine 400, the device control application may provide additional feedback to the user at any operation of the routine 400. In particular, visual and/or aural feedback may be provided to the user during any input operation. For example, the virtual knob 106 selected by a user to initiate a state change may change colors along with an aural tone when pressed and held. A tap from the user to a virtual knob may be associated with a different aural tone. An adjustment around an annular input icon 114 may be accompanied by a clicking sound or tonal change to represent the in-progress adjustment of the associated parameter.

Figure 5:
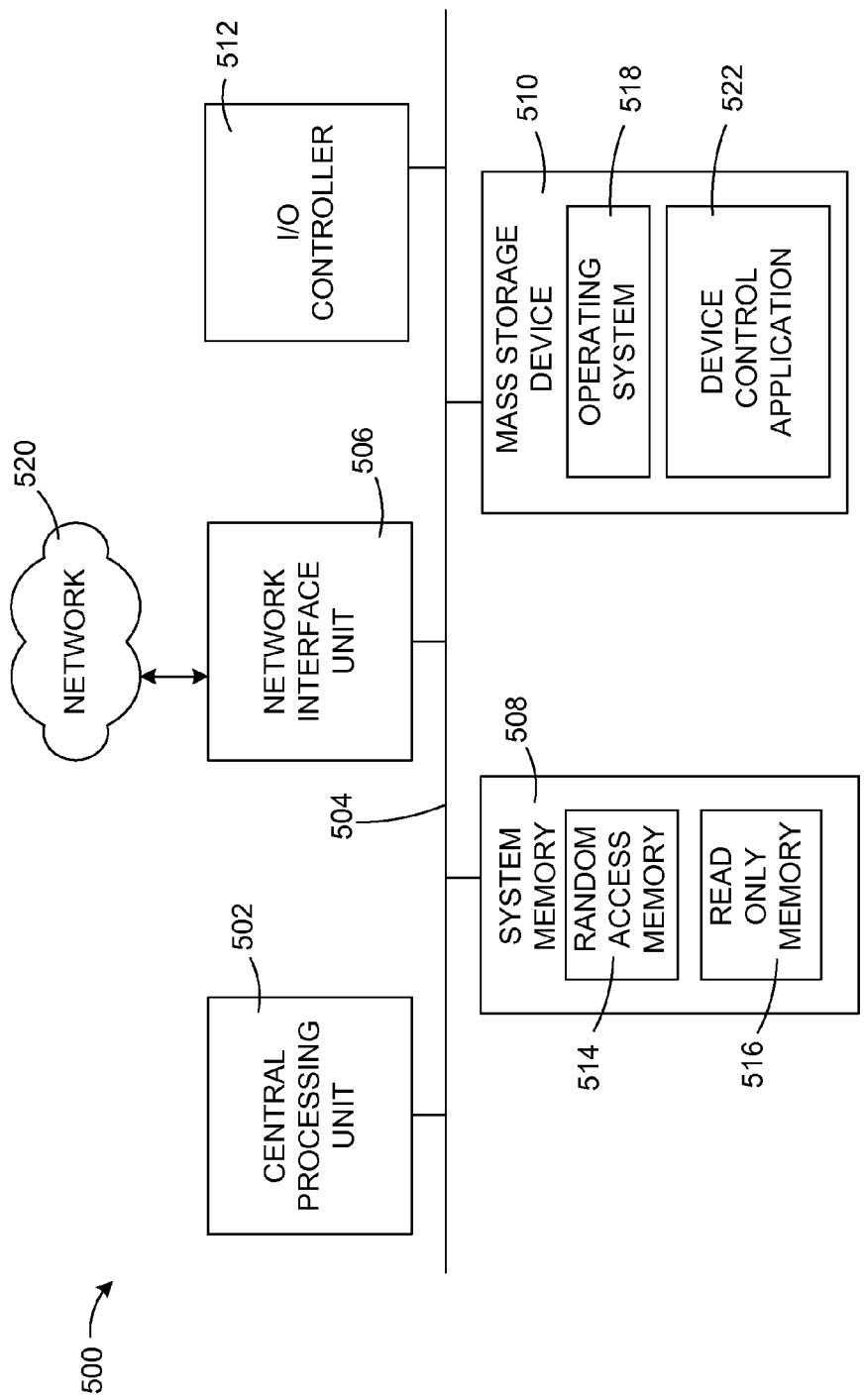
FIG. 5 is a computer architecture diagram showing an illustrative computer hardware and software architecture for a computing system capable of implementing the embodiments presented herein.

FIG. 5 shows an illustrative computer architecture for a computer 500 capable of executing the software components described herein for implementing the embodiments described above. The computer architecture shown in FIG. 5 illustrates a conventional desktop, laptop computer, server computer, tablet computer, smartphone, electronic reader, MP3 player or other digital music device, or any flight computer configured for use with an aircraft system and may be utilized to implement the computer 500 and to execute any of the other software components described herein.

The computer architecture shown in FIG. 5 includes a central processing unit 502 (CPU) or processor, a system memory 508, including a random access memory 514 (RAM) and a read-only memory (ROM) 516, and a system bus 504 that couples the memory to the CPU 502. A basic input/output system (BIOS) containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable storage media can be any available computer storage media that can be accessed by the computer 500.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any non-transitory medium which can be used to store the desired information and which can be accessed by the computer 500.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a touchscreen interface 100, keyboard, mouse, joystick, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 1118 suitable for controlling the operation of a networked desktop, laptop, tablet, smartphone, electronic reader, digital music player, server, or flight computer. The mass storage device 510 and RAM 514 may also store one or more program modules. In particular, the mass storage device 510 and the RAM 514 may store the device control application 522 executable to perform the various operations described above. The mass storage device 510 and RAM 514 may also store other program modules and data.

In general, software applications or modules may, when loaded into the CPU 502 and executed, transform the CPU 502 and the overall computer 500 from a general-purpose computing system into a special-purpose computing system customized to perform the functionality presented herein. The CPU 502 may be constructed from any number of transistors or other discrete circuit elements, which may individually or collectively assume any number of states. More specifically, the CPU 502 may operate as one or more finite-state machines, in response to executable instructions contained within the software or modules. These computer-executable instructions may transform the CPU 502 by specifying how the CPU 502 transitions between states, thereby physically transforming the transistors or other discrete hardware elements constituting the CPU 502.

Encoding the software or modules onto a mass storage device may also transform the physical structure of the mass storage device or associated computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer-readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for receiving user input to a touchscreen interface, the method comprising:
    providing a representation of a device comprising a virtual knob on the touchscreen interface for adjusting a parameter associated with the virtual knob, the virtual knob occupying a first graphical area on the touchscreen interface;
    detecting a selection of the virtual knob;
    in response to detecting the selection of the virtual knob, displaying an annular input icon around the virtual knob, the annular input icon occupying a second graphical area on the touchscreen interface having a larger area than the first graphical area of the virtual knob;
    detecting a user input corresponding motion around the annular input icon; and
    adjusting the parameter associated with the virtual knob of the device and concurrently rotating a representation of the virtual knob according to the user input corresponding motion around the annular input icon.

2. The computer-implemented method of claim 1, wherein the device comprises a vehicle instrument, and wherein the touchscreen interface is associated with a vehicle simulator.

3. The computer-implemented method of claim 1, wherein detecting the user input corresponding to the annular input icon comprises detecting an arcuate contact on a surface of the touchscreen interface within the annular input icon.

4. The computer-implemented method of claim 1,
    wherein the representation of the device further comprises a plurality of virtual knobs, and
    wherein detecting the selection of the virtual knob comprises detecting a first tap on a surface of the touchscreen interface at a position proximate to the virtual knob of the plurality of virtual knobs.

5. The computer-implemented method of claim 1, wherein the annular input icon is at least partially translucent such that the representation of the device underlying the annular input icon is visible through the annular input icon.

6. The computer-implemented method of claim 1, further comprising providing feedback to the user in response to the selection of the virtual knob or in response to the user input.

7. The computer-implemented method of claim 6, wherein the feedback comprises a vibration.

8. The computer-implemented method of claim 6, wherein the feedback comprises an aural response.

9. A computer-readable storage medium having computer-executable instructions stored thereupon which, when executed by a computer, cause the computer to:
    provide a representation of a device comprising a plurality of virtual knobs on a touchscreen interface for adjusting a parameter associated with the virtual knob, each of the plurality of virtual knobs occupying a first graphical area on the touchscreen interface;
    detect a selection of a virtual knob of the plurality of virtual knobs;
    in response to the selection of the virtual knob, determine a virtual knob to receive user input according to the selection and a configuration of the plurality of virtual knobs;
    display an annular input icon around the virtual knob to receive user input, the annular input icon occupying a second graphical area on the touchscreen interface having a larger area than the first graphical area of the virtual knob;
    detect the user input corresponding motion around the annular input icon; and
    adjust the parameter associated with the virtual knob of the device and concurrently rotating a representation of the virtual knob according to the user input corresponding motion around the annular input icon.

10. A computer-implemented method for receiving user input to a touchscreen interface, the method comprising:
    providing a representation of a device comprising a virtual knob on the touchscreen interface for adjusting a parameter associated with the virtual knob, the virtual knob occupying a first graphical area on the touchscreen interface;
    detecting a selection of the virtual knob;
    in response to detecting the selection of the virtual knob, displaying an annular input icon around the virtual knob, the annular input icon is at least partially translucent such that the representation of the device underlying the annular input icon is visible through the annular input icon, and the annular input icon occupying a second graphical area on the touchscreen interface having a larger area than the first graphical area of the virtual knob;
    detecting a user input corresponding motion around the annular input icon; and
    adjusting the parameter associated with the virtual knob of the device and concurrently rotating a representation of the virtual knob according to the user input corresponding motion around the annual annular input icon.

11. The computer-implemented method of claim 10, wherein the annular input icon around the virtual knob comprises a ring that encircles the virtual knob.

12. The computer-implemented method of claim 10, wherein the annular input icon around the virtual knob comprises graphical shading that enables highlighting of the area around the virtual knob.

13. The computer-implemented method of claim 10, wherein the annular input icon around the virtual knob comprises a color that enables highlighting of the area around the virtual knob.

14. The computer-implemented method of claim 10, wherein the annular input icon around the virtual knob comprises a graphical pattern that enables highlighting of the area around the virtual knob.

15. The computer-implemented method of claim 10, wherein the annular input icon being at least partially translucent such that text underlying the annular input icon is visible through the annular input icon.

16. The computer-implemented method of claim 10, wherein the annular input icon being at least partially translucent such that graphics underlying the annular input icon is visible through the annular input icon.

17. The computer-implemented method of claim 10, wherein detecting the selection of the virtual knob comprises detecting a single tap by a user on the touchscreen interface at the location of the representation of the virtual knob.

18. The computer-implemented method of claim 17, further comprising:
    detecting a second selection of the virtual knob while the annular input icon around the virtual knob is being displayed,
    wherein detecting the second selection of the virtual knob comprises detecting a single tap by a user on the touchscreen interface at the location of the representation of the virtual knob.

19. The computer-implemented method of claim 18, further comprising:
    removing the annular input icon around the virtual knob in response to detecting the second selection of the virtual knob.

* * * * *